US008026843B2

(12) United States Patent
Winkler

(10) Patent No.: US 8,026,843 B2
(45) Date of Patent: Sep. 27, 2011

(54) RADAR METHODS AND SYSTEMS USING RAMP SEQUENCES

(75) Inventor: Volker Winkler, Brunnen (DE)

(73) Assignee: Infineon Technologies AG, Neubiberg (DE)

( * ) Notice: Subject to any disclaimer, the term of this patent is extended or adjusted under 35 U.S.C. 154(b) by 846 days.

(21) Appl. No.: 12/023,621

(22) Filed: Jan. 31, 2008

(65) Prior Publication Data
US 2010/0289692 A1 Nov. 18, 2010

(51) Int. Cl.
*G01S 13/42* (2006.01)
*G01S 7/40* (2006.01)
*G01S 13/93* (2006.01)

(52) U.S. Cl. .......... 342/70; 342/109; 342/112; 342/129; 342/174

(58) Field of Classification Search .............. 342/70–72, 342/82–87, 98–100, 109, 112, 129, 174
See application file for complete search history.

(56) References Cited

U.S. PATENT DOCUMENTS

| | | | |
|---|---|---|---|
| 3,750,171 A | 7/1973 | Faris | |
| 4,388,622 A * | 6/1983 | Fletcher, Jr. | 342/112 |
| 4,503,433 A * | 3/1985 | Tomasi | 342/87 |
| 5,111,206 A * | 5/1992 | Madni et al. | 342/15 |
| 5,349,358 A | 9/1994 | Canal | |
| 5,442,359 A * | 8/1995 | Rubin | 342/109 |
| 5,483,242 A * | 1/1996 | Grein et al. | 342/111 |
| 5,619,208 A | 4/1997 | Tamatsu et al. | |
| 5,963,163 A | 10/1999 | Kemkemian et al. | |
| 6,011,507 A * | 1/2000 | Curran et al. | 342/70 |
| 6,104,336 A | 8/2000 | Curran et al. | |
| 6,392,588 B1 * | 5/2002 | Levanon | 342/202 |
| 6,864,832 B2 | 3/2005 | Mende et al. | |
| 7,737,885 B2 * | 6/2010 | Winkler | 342/195 |
| 7,821,443 B2 * | 10/2010 | Winkler et al. | 342/70 |
| 7,932,855 B2 * | 4/2011 | Uebo | 342/129 |
| 2005/0046607 A1 * | 3/2005 | Volman | 342/109 |
| 2005/0156780 A1 * | 7/2005 | Bonthron et al. | 342/107 |
| 2005/0225481 A1 * | 10/2005 | Bonthron | 342/175 |
| 2010/0085233 A1 * | 4/2010 | Wintermantel et al. | 342/18 |

(Continued)

FOREIGN PATENT DOCUMENTS

DE 19602437 A1 7/1996

(Continued)

OTHER PUBLICATIONS

"Waveform Design Principles for Automotive Radar Systems", Hermann Rohling and Marc-Michael Meinecke, German Radar Symposium GRS 2000, 4 pgs.

(Continued)

*Primary Examiner* — John Sotomayor
(74) *Attorney, Agent, or Firm* — Eschweiler & Associates, LLC

(57) ABSTRACT

One embodiment of the present invention relates to a method for detecting a range and velocity of a target. In this method, an electromagnetic wave is transmitted over a frequency range, where a period of the wave comprises a number of consecutive ramps. A first ramp in the period is transmitted over a first portion of the frequency range, and a second ramp in the period is transmitted over a second portion of the frequency range that differs from the first portion. The second ramp is offset by a frequency shift relative to the first ramp. A scattered wave is received from the target and processed to determine the range and the velocity of the target. Other methods and systems are also disclosed.

20 Claims, 6 Drawing Sheets

U.S. PATENT DOCUMENTS

| | | | |
|---|---|---|---|
| 2010/0289692 A1* | 11/2010 | Winkler | 342/70 |
| 2011/0037641 A1* | 2/2011 | Steffens | 342/70 |
| 2011/0050484 A1* | 3/2011 | Nakanishi | 342/87 |

FOREIGN PATENT DOCUMENTS

| | | |
|---|---|---|
| DE | 100 50 278 A1 | 4/2002 |

OTHER PUBLICATIONS

"Combination of LFMCW and FSK Modulation Principles for Automotive Radar Systems", Marc-Michael Meinecke and Hermann Rohling, German Radar Symposium GRS2000, Berlin, Oct. 11-12, 2000, 4 pgs.

* cited by examiner

RADAR METHODS AND SYSTEMS USING RAMP SEQUENCES

FIELD OF INVENTION

The present invention relates generally to radar systems, and more particularly to frequency modulated continuous wave (FMCW) radar systems.

BACKGROUND OF THE INVENTION

Radar is a system that uses electromagnetic waves to identity the range, direction, and/or velocity of both moving objects and stationary targets. For example, radar is often used to detect weather conditions, ships, aircraft, motor vehicles, geological formations, as well as many other applications.

To facilitate this functionality, radar systems include a radar transmitter that transmits electromagnetic waves, such as radio waves, which are scattered or reflected by a target. A radar receiver, which is typically in approximately the same location as the transmitter, then receives the scattered wave and analyzes it to determine the range, direction, and/or velocity of the target. Because radio frequency signals are relatively easy to amplify, even though the scattered wave is usually very weak, the receiver can amplify the received scattered wave so it can be suitably processed. Therefore, radar systems can detect objects at ranges where other electromagnetic waves, such as sound or visible light, would be too weak to detect.

As will be appreciated from the above discussion and embodiments described herein, there is an on-going need for improvements in radar systems.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

One embodiment of the present invention relates to a system and method for detecting a range and a velocity of a target. In this method, an electromagnetic wave is transmitted over a frequency range, where a period of the wave comprises a number of consecutive ramps. A first ramp in the period is transmitted over a first portion of the frequency range, and a second ramp in the period is transmitted over a second portion of the frequency range that differs from the first portion. The second ramp is offset by a frequency shift relative to the first ramp. A scattered wave is received from the target and processed to determine the range and the velocity of the target.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
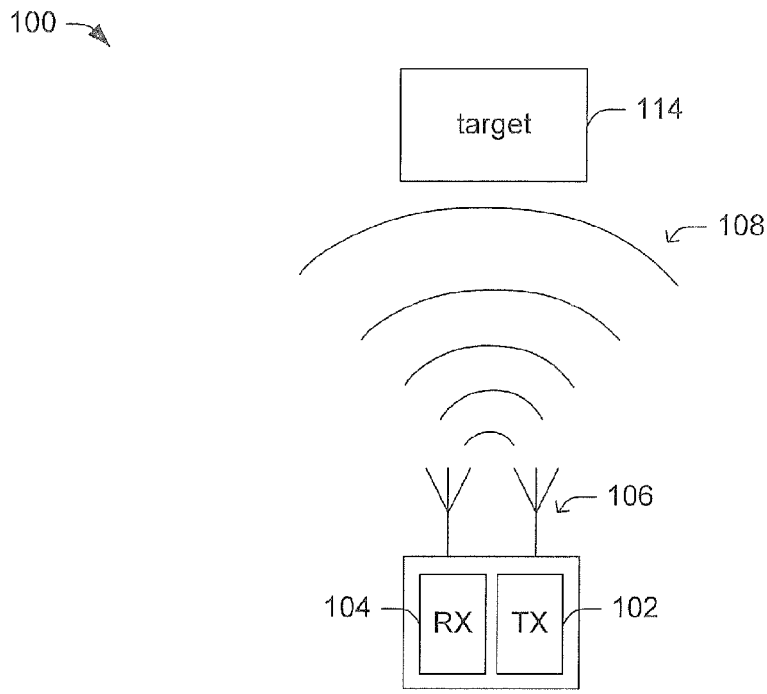
FIGS. 1-2 show a radar system that includes a radar transmitter and a radar receiver.

One or more implementations of the present invention will now be described with reference to the attached drawings, wherein like reference numerals are used to refer to like elements throughout.

Figure 2:
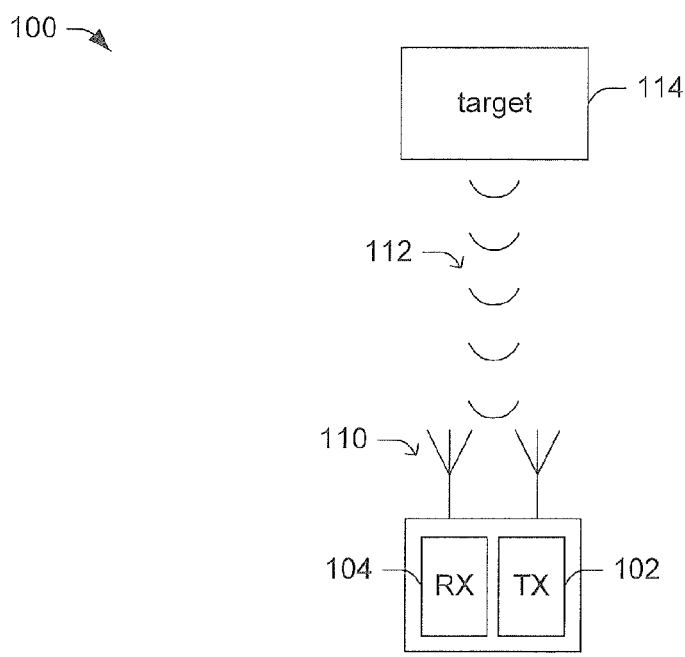

Referring to FIGS. 1-2, an example of a radar system 100 that includes a transmitter 102 and a receiver 104 is depicted. In one embodiment, the transmitter 102 and receiver 104 are in the same location, such as in a motor vehicle equipped with a radar system, for example. As FIG. 1 shows, the radar transmitter 102 includes at least one antenna 106 for transmitting electromagnetic waves 108, such as radio waves. Similarly, the radar receiver 104 in FIG. 2 includes at least one antenna 110 for receiving a scattered wave 112 that is reflected from a target 114. In one embodiment, the transmitter 102 and receiver 104 can transmit and receive these signals 108, 112 in conjunction with one another to determine both the range and velocity of the target 110.

In one embodiment, radar system 100, and the transmitter 102 and the receiver 104, comprises a continuous wave radar system. Continuous wave radar works by detecting a phase shift between the transmitted wave 108 and the scattered wave 112, and then analyzing the phase shift to determine information about a target 114. To facilitate this detection capability, the transmitter 102 changes the frequency of the transmitted wave 108 as a function of time. After being transmitted, there is a delay before the transmitted wave 108 reflects off the target 114 and the scattered wave 112 is received by the receiver 104. For FMCW radar systems a frequency ramp is generated and transmitted. The scattered signal 112 is down-converted in a mixer with the help of the transmitted signal. The received signal is a delayed frequency ramp having a phase shift that is a function of the time of flight. Multiplication of the transmitted and received signal, which is performed by a mixer, provides a baseband signal having a frequency that is directly proportional to the distance of the target from the radar system 100. During this delay, the transmitter 102 shifts to transmit at some other frequency. Generally, the amount of shift between the transmitted wave 108 and the scattered wave 112 is greater over longer times, so a greater phase shift may tend to correspond to longer distances, for example. In this way, the range to the target 114 can be determined in one embodiment. Unambiguously determining both the velocity and range of a given target, however, can be difficult.

Figure 3:
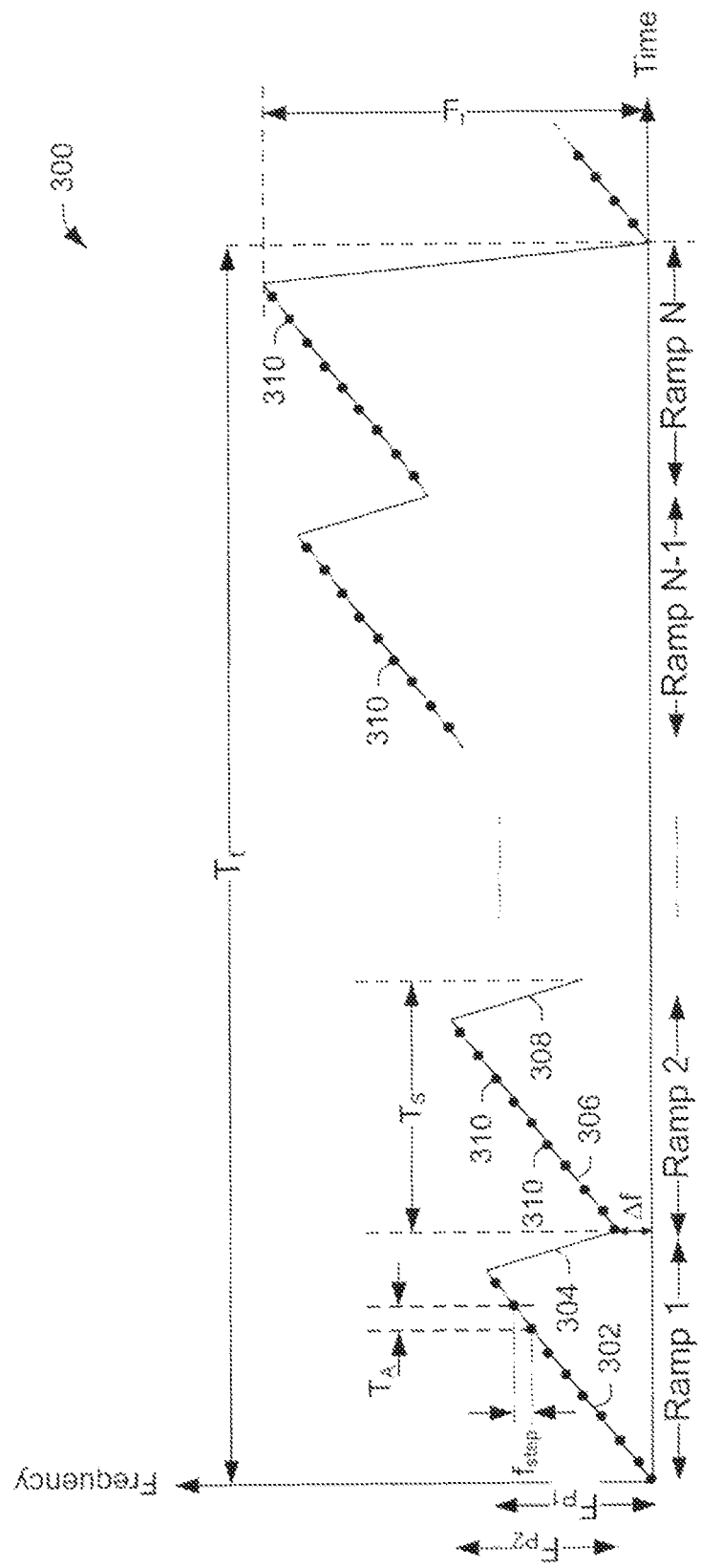
FIG. 3 shows one embodiment of an electromagnetic wave in accordance with the present invention.

FIG. 3 shows one embodiment of an electromagnetic wave 300 in accordance with aspects of the invention. While other solutions in frequency modulated continuous wave (FMCW) radar systems may also provide for range and velocity detection, embodiments of the present invention provide several advantages. For example, in comparison to many other systems, this solution provides a relatively small IF bandwidth, which simplifies the circuitry of the radar system. Also, while some prior solutions require an I/Q demodulator, the present solution can be realized with or without an I/Q demodulator. I/Q demodulators typically require at least two mixers and a 90° phase shift module. In embodiments without an I/Q demodulator, the present invention can comprise only a single mixer for modulation, which reduces the current consumed and the area on the circuit board or integrated circuit. Therefore, the electromagnetic wave of FIG. 3 and the associated circuitry can provide performance and cost benefits.

As shown, the electromagnetic wave 300 spans a total frequency range, $F_t$, and has a period, $T_t$, which in some embodiments corresponds to a period of a baseband frequency. Within the illustrated period, $T_t$, the electromagnetic wave 300 includes a series of N consecutive ramps that each has a duration of $T_s$, where the ramps are transmitted in ascending or descending order with a frequency shift, $\Delta f$, therebetween. Thus, the N consecutive ramps cover the frequency range, $F_t$, but each consecutive ramp covers only a fraction of the frequency range $F_t$. In the illustrated embodiment, the ramps are triangular ramps. However, in other embodiments the ramps can also be substantially triangular and/or have other geometries.

More specifically, the wave 300 includes a first consecutive ramp (Ramp 1) transmitted over a first portion $F_{P1}$ of the frequency range $F_T$. The first consecutive ramp (Ramp 1) includes a first ramp segment 302 that is piece-wise continuous with a second ramp segment 304. A second consecutive ramp (Ramp 2) is transmitted over a second portion $F_{P2}$ of the frequency range $F_t$ and includes a third ramp segment 306 that is piece-wise continuous with both the second ramp segment 304 and a fourth ramp segment 308. Often, the first and third ramp segments 302, 306 have one slope (e.g., a positive slope), and the second and fourth ramp segments 304, 308 have another slope (e.g., a negative slope). Again, the first and second consecutive ramps (Ramp 1, Ramp 2) are offset by the frequency shift, $\Delta f$, relative to one another. Additional consecutive ramps are also formed within the period $T_t$ in a similar manner as shown.

Along each ramp there are, in various embodiments, L sampling points 310. In essence, the radar system takes measurements (samples) of both the transmitted wave and received scattered wave at these times, and then measures a phase difference between the transmitted and received signals. This phase difference can then be used to unambiguously determine the range and velocity of a target. As shown, consecutive sampling times are separated by a sampling interval, $T_A$. There is a frequency step, $f_{step}$, between frequencies associated with consecutive sampling times.

Figure 4:
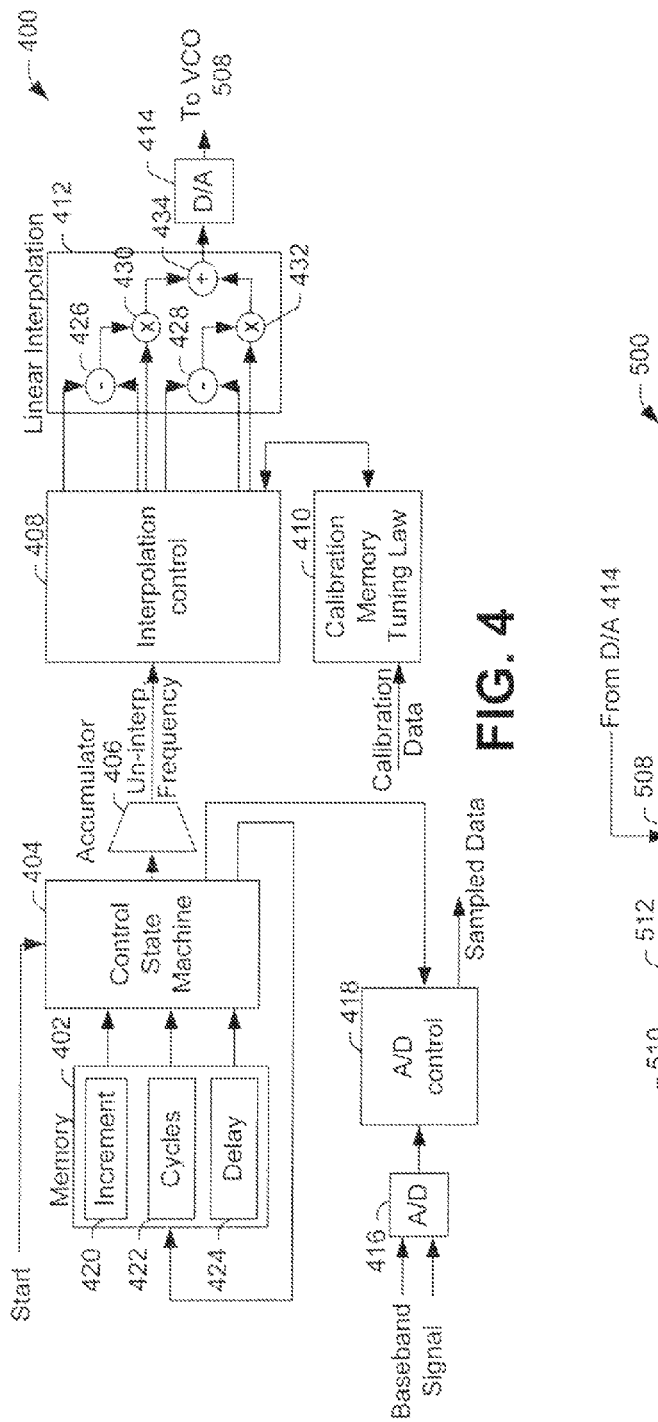
FIG. 4 is a block diagram of one embodiment of a digital circuit for a radar system in accordance with the present invention.

Referring now to FIG. 4, one embodiment of a block diagram of a circuit 400 configured to realize the electromagnetic wave shown in FIG. 3 is depicted. To transmit the electromagnetic wave, the circuit 400 includes a memory 402, a control state machine 404, an accumulator 406, an interpolation circuit 408, a calibration memory tuning law circuit 410, a linear interpolation control circuit 412, and a digital-to-analog (D/A) converter 414 in one embodiment. The D/A 414 sends a final interpolated value to a voltage controlled oscillator (VCO) 508 that transmits an electromagnetic wave 300 as previously discussed. To provide the sampled data on the receiver side, the circuit 400 of FIG. 4 includes an analog-to-digital (A/D) converter 416 that operates in conjunction with an A/D controller 418. The A/D converter 416 receives a baseband signal, which is a down-converted version of the scattered wave signal received by one or more receivers.

To transmit the desired electromagnetic wave 300, the memory 402 stores data related to the ramps of the electromagnetic wave 300. More specifically, an increment memory 420 stores the slope associated with each ramp, a cycle memory 422 stores the duration for which each slope is to be transmitted, and a delay memory 424 determines when to start the control state machine 404 and analog-to-digital (A/D) converter 416.

The control state machine 404 periodically reads from the memory 402 by incrementing a memory address to facilitate the desired ramp shaping. For example, to create the first ramp, the control state machine 404 reads the increment memory 420 to find the slope of the first ramp (e.g., "2"), reads the cycle memory 422 to ascertain the duration of the first ramp (e.g., "10 clock cycles"), and reads the delay memory 424 for the delay (e.g., "100 clock cycles"). Thus, after receiving the "start" signal, the control state machine 404 waits (delay) 100 clock cycles, and then provides a ramp slope of 2 for the next 10 clock cycles to the accumulator 406.

In one embodiment the accumulator 406 adds the value of the present slope to a present count value stored therein. In this manner, the accumulator 406 outputs a series of un-interpolated frequencies to the interpolation control 408. Over time, the un-interpolated frequencies are used to form the ramps as shows in FIG. 3, but may be slightly non-linear. For example, assuming the accumulator 406 was initialized to "0" in the example from the previous paragraph, for the first 100 clock cycles the accumulator 408 outputs an un-interpolated frequency of "0" to the interpolation control 408, then in clock cycle 101 presents an un-interpolated frequency of 2, then at clock cycle 102 presents an un-interpolated frequency of 4, and so on. In this manner, a linearly increasing un-interpolated frequency can be provided.

The interpolation control circuit 408 may work in conjunction with the calibration memory tuning law circuit 410 to ensure that the ramp segments that are actually transmitted are linear. To this end, before the ramp segment generation starts (e.g., during the delay cycles), the calibration memory tuning law circuitry 410 characterizes the behavior of the VCO 508 over the frequency at which the electromagnetic waves will be transmitted. If the tuning law of the VCO is nonlinear, the calibration memory tuning law circuitry 410 stores data indicative of this non-linearity. During transmission, the interpolation control circuit 408 receives the present frequency to be transmitted from the accumulator 406, and calculates the necessary D/A-converter samples for a linear ramp. based on the data provided by the calibration memory tuning law circuit 410.

In one embodiment the linear interpolation circuit 412 includes subtractors 426, 428; mixers 430, 432; and an adder 434 that provide a final interpolated frequency value to the D/A converter 414. The D/A converter 414 converts this final interpolated frequency value into analog form and passes it to the VCO 508.

On the receiver-side, the circuit 400 receives the baseband signal (which has been down-converted), and converts it to a digital signal at the A/D converter 416. The A/D controller 418 works in conjunction with the A/D converter 416 to provide the sampled data that is representative of the scattered wave.

Figure 5:
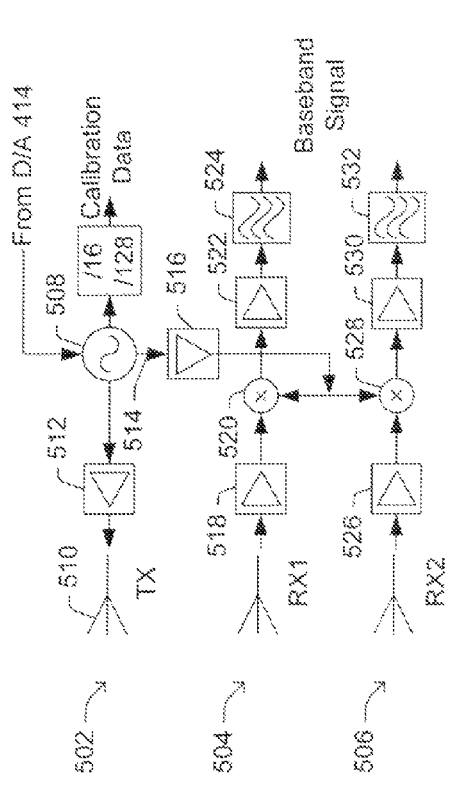
FIG. 5 is a block diagram of one embodiment of an analog circuit for a radar system in accordance with the present invention.

Referring now to FIG. 5, an example of an analog circuit 500 that can interface with the circuit 400 to transmit and receive the desired electromagnetic waves is depicted. The analog circuit 500 includes in one embodiment a transmitting channel 502; two receive channels 504, 506; and the VCO 508. In short, the VCO 508 can receive an analog version of the final interpolated frequency value and transmit it over a transmission antenna 510 with the aid of an output buffer 512 with variable gain, such as a power amplifier. To process the scattered wave on the receiver-side, the VCO 508 has a local oscillator (LO) output 514 that, after passing through an LO output buffer 516, is used to down-convert the received scattered wave to the baseband frequency. More specifically, each receive channel 504, 506 includes a receive buffer, and a mixer (e.g., active Gilbert mixer) that down-converts the received scattered wave to the baseband or IF frequency. Thus, the first receive channel 504 includes first receive buffer 518 and first mixer 520, as well as a first mixed buffer 522 and a first band-pass filter 524. Similarly, the second receive channel 506 includes a second receive buffer 526 and second mixer 528, as well as a second mixed buffer 530 and a second band-pass filter 532.

Figure 6:
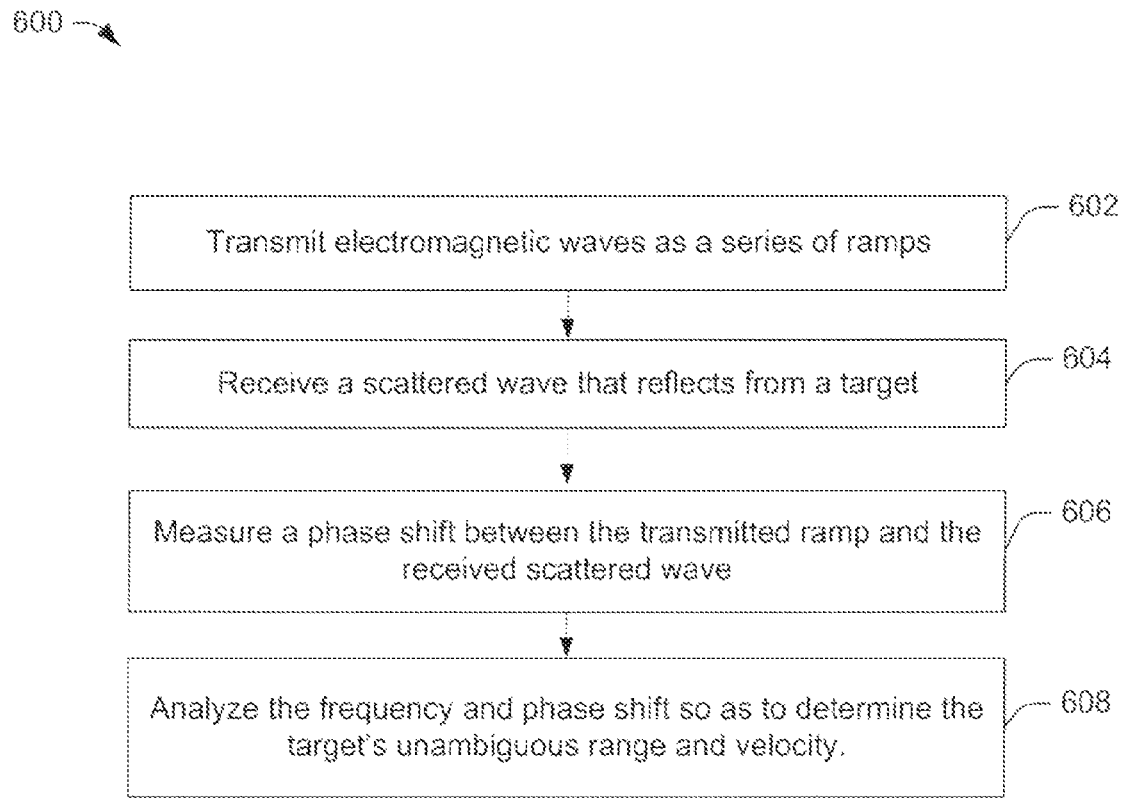
FIG. 6 is a flowchart illustrating a method of detecting a range and velocity of a target in accordance with an embodiment of the invention.
Figure 7:
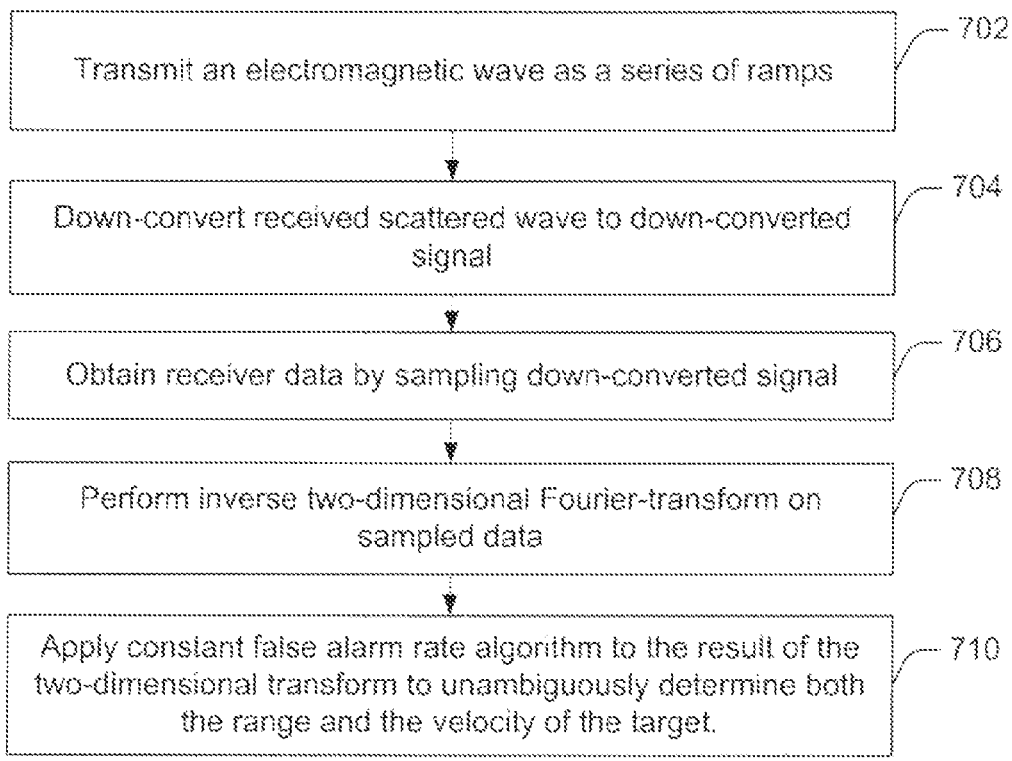
FIG. 7 is a flowchart illustrating another method of detecting a range and velocity of a target in accordance with an embodiment of the invention.

Now that some example embodiments of systems that can achieve advantageous radar techniques have been discussed, reference is made to FIGS. 6-7, which show methods in accordance with aspects of the invention. FIG. 6 shows a somewhat general method, while FIG. 7 shows a more detailed method. While these methods are illustrated and described below as a series of acts or events, the present invention is not limited by the illustrated ordering of such acts or events. For example, some acts may occur in different orders and/or concurrently with other acts or events apart from those illustrated and/or described herein. In addition, not all illustrated steps may be required to implement a methodology in accordance with one or more aspects of the present invention. Further, one or more of the acts depicted herein may be carried out in one or more separate acts or phases.

In FIG. 6, method 600 starts at 602 when a frequency continuous radio signal is transmitted as a series of ramps, such as substantially triangular ramps, having a period and a frequency range. In this signal, adjacent ramps are offset by a frequency shift relative to one another and are transmitted over different fractions of the frequency range.

At 604, a scattered wave is received, wherein the scattered wave is reflected from a target.

At 606, a phase shift is measured between the ramp being presently transmitted and the received scattered wave presently received.

At 608, the phase shift and frequency of the waves are analyzed to determine the target's unambiguous range and velocity. Therefore, both the range and velocity of the target can be measured.

In FIG. 7, the somewhat more specific method 700 starts at 702 where the frequency-continuous radio signal is transmitted.

In 704, the scattered wave is received after reflecting off a target, and is down-converted to a down-converted signal.

In 706, sampled data is obtained by sampling the down-converted signal.

In 708, an inverse two-dimensional inverse Fast Fourier-transform (2D-IFFT) is performed on the sampled data.

In 710, a constant false alarm rate (CFAR) algorithm is applied to the result of the 2D-IFFT to unambiguously determine both the range and velocity of the target.

For purposes of understanding some implementations of the invention, what follows below is a mathematical explanation of a measurement principle in accordance with a ramp sequence such as set forth in FIG. 3. It will be appreciated that although this implementation below is an advantageous solution, other solutions are also contemplated as falling within the scope of the present invention.

The transmitter frequency for the first ramp in FIG. 3 can be expressed as:

$$f_T(t) = f_c + \frac{f_{step}}{T_A} t \quad (1)$$

The phase $\phi_T(t)$ of the transmitted signal $\cos(\phi_T(t))$ becomes after integration:

$$\varphi_T(t) = 2\pi \int_0^t f_T(t) dt \quad (2)$$
$$= 2\pi \left( f_c t + \frac{1}{2} \cdot \frac{f_{step}}{T_A} t^2 \right) \Big|_0^t$$
$$= 2\pi \left( f_c t + \frac{1}{2} \cdot \frac{f_{step}}{T_A} t^2 \right) \varphi_{T0}$$

where $f_c$ is the frequency of a carrier wave, and $f_{step}$ and $T_A$ are as shown and described in FIG. 3. The phase of the down-converted signal $\Delta\phi(t)=\phi_T(t)-\phi_T(t-\tau)$ is:

$$\Delta\varphi(t) = 2\pi \left( f_c \tau + \frac{f_{step}}{T_A} t\tau - \frac{f_{step}}{2T_A} \tau^2 \right) \quad (3)$$

$\tau$ is the delay between the transmitted and received signal of one target. The last term in the equation above can be neglected because $\tau/T \ll 1$. For calculation of the delay $\tau=2(R+\upsilon \cdot t)/c$, a target at distance R with constant velocity $\upsilon$ is assumed. This leads to:

$$\Delta\varphi(t) = 2\pi \left[ \frac{2 f_c R}{c} + \left( \frac{2 f_c \cdot \upsilon}{c} + \frac{2 f_{step} \cdot R}{T_A \cdot c} \right) t + \frac{2 f_{step} \cdot \upsilon}{T_A \cdot c} t^2 \right] \quad (4)$$

The last term is called Range-Doppler-Coupling and can be neglected again:

$$\Delta\varphi(t) = 2\pi \left[ \frac{2 f_c R}{c} + \left( \frac{2 f_c \cdot \upsilon}{c} + \frac{2 f_{step} \cdot R}{T_A \cdot c} \right) t \right] \quad (5)$$

As described in FIG. 3, N consecutive ramps are generated, with a frequency shift $\Delta f$ between adjacent ramps. For the N-th ramp the phase difference at the receiver can be expressed as:

$$\Delta\varphi(t) = 2\pi \left( (f_c + n \cdot \Delta f)\tau + \frac{f_{step}}{T_A}(t - n \cdot T_s)\tau \right) \quad (6)$$

With $\tau=2(R+\upsilon \cdot t)/c$ the phase difference of the equation above can be written as:

$$\Delta\varphi(n\cdot T_s + l\cdot T_A) = 2\pi \left[ \frac{2(f_c + n\cdot \Delta f)R}{c} + \frac{2f_c \upsilon \cdot T_s \cdot n}{c} + \left(\frac{2f_c \upsilon}{c} + \frac{2f_{step}\cdot R}{T_A \cdot c}\right)T_A \cdot l \right] \quad (7)$$

The phase difference is evaluated at the discrete time $t=n\cdot T_s + l\cdot T_A$. Sorting the terms according to n and l leads finally to:

$$\Delta\varphi(n\cdot T_s + l\cdot T_A) = 2\pi \left[ \frac{2f_c R}{c} + \left(\frac{R\Delta f \cdot n}{c} + \frac{2f_c \upsilon \cdot T_s \cdot n}{c}\right) + \left(\frac{2f_c \upsilon \cdot T_A \cdot l}{c} + \frac{2\cdot Rf_{step}\cdot l}{c}\right) \right] \quad (8)$$

If an I/Q-Demodulator is present in the system, the received signal is:

$$s_{IF}=\cos(\Delta\phi(n\cdot T_s+l\cdot T_A))-i\sin(\Delta\phi(n\cdot T_s+l\cdot T_A))= e^{-i\Delta\phi(n\cdot T_s+l\cdot T_A)} \quad (9)$$

In order to detect targets, an inverse two-dimensional Fast Fourier transform (2D-IFFT) can be applied:

$$S_{2D}(k,p) = e^{-i4\pi f_c \cdot R/c} \sum_{l=0}^{L-1}\sum_{n=0}^{N-1} w(l,n)\cdot e^{-i\cdot 2\pi\left(\frac{2f_c\upsilon\cdot T_A\cdot l}{c}+\frac{2\cdot R\cdot f_{step}\cdot l}{c}\right)} e^{-i\cdot 2\pi\left(\frac{2f_c\upsilon\cdot T_s\cdot n}{c}+\frac{(2R\cdot\Delta f n)}{c}\right)}\cdot e^{i\cdot 2\pi\left(\frac{l\cdot p}{L_z}+\frac{n\cdot k}{N_z}\right)} \quad (10)$$

N is the number of ramps within a given period, and L is the number of sampling points on one ramp. $N_z$ and $L_z$ are the number of points in the 2D-IFFT after zero-padding. The window function w(l,n) is used to reduce the side lobes after the IFFT. w(l,n) is set to one to simplify the following equations without restricting the generality. The equation above can be re-ordered to that two-dimensional spectrum can calculated from one-dimensional IFFTs.

$$S_{2D(k,p)} = e^{-i\cdot 4\pi \cdot f_c \cdot R/C} \sum_{l=0}^{L-1} e^{-i\cdot 2\pi\left(\frac{2f_c\upsilon\cdot T_A}{c}+\frac{2\cdot R\cdot f_{step}}{c}\right)l} \left[\sum_{n=0}^{N-1} e^{-i\cdot 2\pi\left(\frac{2f_c\upsilon\cdot T_s}{c}+\frac{(2R\cdot\Delta f)}{c}\right)\cdot n}\cdot e^{i2\pi\left(\frac{n\cdot k}{N_z}\right)}\right] e^{i\cdot 2\pi\left(\frac{l\cdot p}{L_z}\right)} \quad (11)$$

A peak of a target with distance R and velocity $\upsilon$ occurs therefore at the following position:

$$\frac{2\upsilon\cdot f_c \cdot T_s}{c} + \frac{2R\cdot \Delta f}{c} = \frac{k}{N_z} \quad (12)$$

$$\frac{2\upsilon\cdot f_c \cdot T_A}{c} + \frac{2R\cdot f_{step}}{c} = \frac{p}{L_z} \quad (13)$$

The position of one peak, that has been detected at k and p, can be used to calculate the distance R and velocity v by solving the equations above:

$$R = \frac{c\cdot L_z \cdot T_A \cdot k - c\cdot N_z \cdot T_s \cdot p}{(2\Delta f \cdot T_A - 2\cdot f_{step}\cdot T_s)N_z \cdot L_z} \quad (14)$$

$$\upsilon = \frac{c\cdot L_z \cdot f_{step}\cdot k - c\cdot N_z \cdot \Delta f \cdot p}{(2f_c \cdot \Delta f_{step}\cdot T_s - 2f_c \cdot \Delta f \cdot T_A)N_z \cdot L_z} \quad (15)$$

The range resolution along the k-axis can be derived from equation 12:

$$\Delta R_l = \frac{c}{2f_{step}N} \quad (16)$$

The velocity resolution is given by:

$$\Delta \upsilon_l = \frac{c}{2f_c T_s N} \quad (17)$$

The range resolution along the p-axis is related to the bandwidth of a short ramp:

$$\Delta R_s = \frac{c}{2\Delta fL} \quad (18)$$

The velocity resolution is determined by the duration of the short ramp:

$$\Delta \upsilon_s = \frac{c}{2f_c T_A L} \quad (19)$$

In some embodiments, FMCW-radar system comprise a single mixer instead of an I/Q-Demodulator in order to reduce current consumption and space for a second mixer and the 90°-phaseshift module. As a consequence, half of the unambiguous range is lost. The presented principle also applies to a single mixer embodiment. In equation 9 the Q-signal is lost and $\cos(\Delta\phi)$ remains in case of a single mixer, which leads to:

$$s_{IF}=\cos(\Delta\phi(n\cdot Ts+l\cdot T_A)) \quad (20)$$

The 2D-IFFT becomes:

$$S_{2D}(k, p) = \sum_{l=0}^{L-1} \sum_{n=0}^{N-1} \cos\left(2\pi \left(\frac{\frac{2f_c \cdot R}{c} + \frac{(2f_c v \cdot T_A + 2R \cdot f_{step}) \cdot l}{c} + \frac{(2f_c v \cdot T_S + 2R \cdot \Delta f) \cdot n}{c}}{}\right)\right) \cdot e^{i \cdot 2\pi \left(\frac{l \cdot p}{L_z} + \frac{n \cdot k}{N_z}\right)} \quad (21)$$

The term $\cos(\Delta\phi)$ can be written as $e^{i \cdot \Delta\phi} - i \cdot e^{i \cdot \Delta\phi}$:

$$S_{2D,IQ}(k, p) = \sum_{l=0}^{L-1} \sum_{n=0}^{N-1} [e^{i\Delta\varphi} + e^{-i\Delta\varphi}] \cdot e^{i \cdot 2\pi\left(\frac{l \cdot p}{L_z} + \frac{n \cdot k}{N_z}\right)} \quad (22)$$

A peak of one target occurs therefore not only at k and p, but also at −k and −p $$\frac{2v \cdot f_c \cdot T_s}{c} + \frac{2R \cdot \Delta f}{c} = \pm \frac{k}{N_z} \quad (23)$$

$$\frac{2v \cdot f_c \cdot T_A}{c} + \frac{2R \cdot f_{step}}{c} = \pm \frac{P}{L_z} \quad (24)$$

This means that a rotation of 180° around the center maps the 2D-IFFT-spectrum onto itself again. The unambiguous range is therefore reduced by a factor of 2 compared to the embodiment with an I/Q-Demodulator:

$$R_{l,unamb} = \frac{c}{4 f_{step}} \quad (25)$$

$$R_{s,unamb} = \frac{c}{4 \Delta f} \quad (26)$$

This is also true for the unambiguous velocity range:

$$v_{l,unamb} = \pm \frac{c}{4 f_c T_s} \quad (27)$$

The peak position p is nearly independent of the velocity and is positive, because the duration $T_s$ is rather short in a practical system. The slope of the short ramp allows application of the principle without the I/Q-Demodulator. The parameter $\Delta f$ is chosen according to equation 26 so that the whole distance range of interest is covered by $L_z/2$. If the peak position occurs in p∈[0, Lz/2], the true position lies at point P=(k,|p|). Otherwise the true position is P=(−k,|p|) for p∈[−$L_z$/2+1,0] or p∈[Lz/2+1,Lz]. The decision rule is finally:

$$p \geq 0 \Rightarrow P = (k, |p|) \quad (28)$$

$$p < 0 \Rightarrow P = (-k + r \cdot N_z, |-p|) r \in \{0, 1\} \quad (29)$$

For the case p<0 the velocity v can be calculated according to equation 27 for the two possibilities r∈{0,1}. Thus, a velocity for each of the two possibilities will be calculated. The velocity that fulfills the unambiguous range from equation 27 is the true velocity for the target and the other velocity can be discarded. The case r=0 occurs if k becomes negative due to a negative velocity. The other case r=1 covers situations in which k is greater than $N_z/2$ due to a positive velocity. Other cases of aliasing, where the velocity is higher than the unambiguous range, are often not detected.

Figure 8:
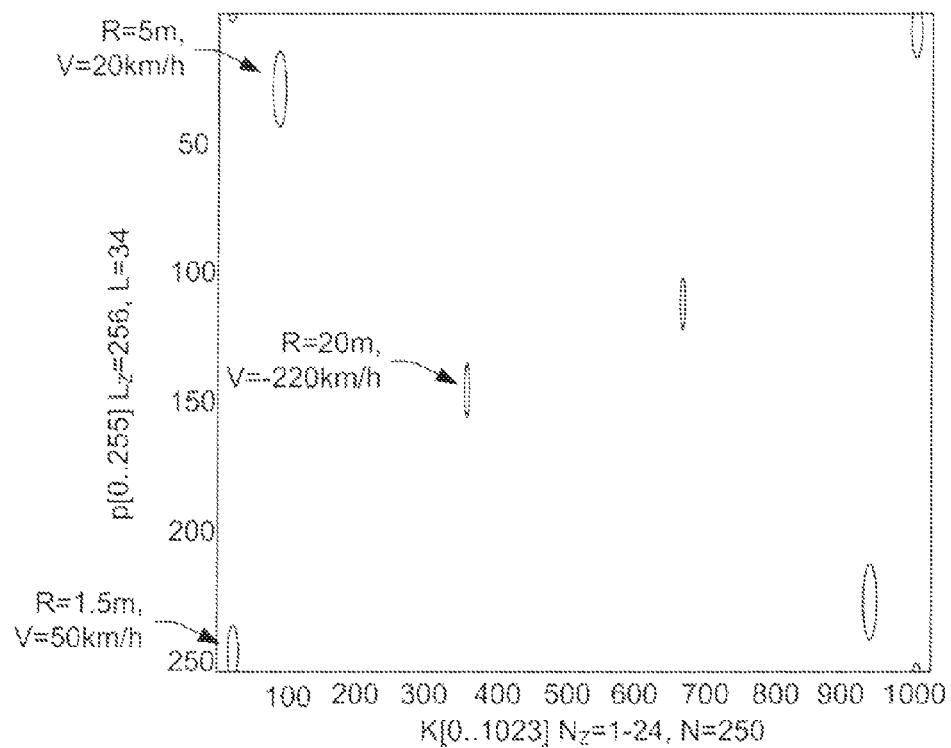
FIG. 8 illustrates a magnitude plot for one example of a two-dimensional inverse Fast Fourier transform (2D-IFFT)

A simulation example is given in FIG. 8 with the following parameters: $f_{step} = \Delta f = 3.2$ MHz, $T_A = 0.4$ μs, $T_s = 24$ μs, $f_c = 24$ GHz. Three targets have been assumed, where each case is discussed:

R=1.5 m, υ=50 km/h, k would become negative, so the peak appears at k=21, p=249

Case: p<0, r=0⇒P=(−20, 256−248)

R=5 m, υ=20 km/h,

Peak Position: k=88, p=27

Case: p≧0⇒P=(88,27)

R=20 m, υ=−220 km/h

Peak Position: k=355, p=147

Case: p<0,r=1⇒P=(−355+Nz=669,109)

If the number of sampling points on a ramp segment is low, the peak along the p-axis becomes very broad and the peak position p is hard to estimate. This influences the accuracy of the calculated distance and velocity of one target. In order to overcome this problem, two 2D-IFFTs can be calculated: the first one without the last point of every ramp segment, the second one without the first point of every ramp segment.

$$S_{2D,S1}(k, p) = \sum_{l=0}^{L-2} \sum_{n=0}^{N-1} \cos\left(2\pi \left(\frac{\frac{2f_c \cdot R}{c} + \frac{(2f_c v \cdot T_A + 2R \cdot f_{step}) \cdot l}{c} + \frac{(2f_c v \cdot T_S + 2R \cdot \Delta f) \cdot n}{c}}{}\right)\right) \cdot e^{i \cdot 2\pi\left(\frac{l \cdot p}{L_z} + \frac{n \cdot k}{N_z}\right)} \quad (30)$$

$$S_{2D,S2}(k, p) = \sum_{l=0}^{L-1} \sum_{n=0}^{N-1} \cos\left(2\pi \left(\frac{\frac{2f_c \cdot R}{c} + \frac{(2f_c v \cdot T_A + 2R \cdot f_{step}) \cdot l}{c} + \frac{(2f_c v \cdot T_S + 2R \cdot \Delta f) \cdot n}{c}}{}\right)\right) \cdot e^{i \cdot 2\pi\left(\frac{l \cdot p}{L_z} + \frac{n \cdot k}{N_z}\right)} \quad (31)$$

The peak of one target occurs at the same position k, p of the two 2D-IFFTs. But there is a phase difference between the two peaks according to the frequency shift $f_{step}$ and time shift $T_A$.

$$\Delta\varphi_R = \angle(S_{2D,S1}(k, p) \cdot S_{2D,S2}(k, p)^*) = 2\pi \left[\frac{2v \cdot f_c \cdot T_A}{c} + \frac{2R \cdot f_{step}}{c}\right] \quad (32)$$

Together with equation 23 the phase difference $\Delta\varphi_R$ can be used to calculate the distance and velocity more precisely:

$$R = \frac{c \cdot 2\pi \cdot T_A \cdot k - c \cdot N_z \cdot T_s \cdot \Delta\varphi_R}{2\pi N_z (2\Delta f \cdot T_A - 2 \cdot f_{step} \cdot T_s)} \quad (33)$$

$$v = \frac{c \cdot 2\pi \cdot f_{step} \cdot k - c \cdot N_z \cdot \Delta f \cdot \Delta\varphi_R}{2\pi N_z (2 f_c \cdot \Delta f_{step} \cdot T_s - 2 f_c \cdot \Delta f \cdot T_A)} \quad (34)$$

The phase difference $\Delta\phi_R$ can also be used instead of equation 28 to determine the sign of k:

$$\Delta\phi_R \geq 0 \Rightarrow P = (k, |p|) \quad (35)$$

$$\Delta\phi_R < 0 \Rightarrow P = (-k + r \cdot N_z, |-p|) r \in \{0,1\} \quad (36)$$

FIG. 8 shows a measurement example with three significant peaks;

DC-Offset: Unwanted signal due to imperfect system
Moving corner reflector at R=1.82 m, υ=12 km/h
Door frame at R=4.3 m, υ=0.48 km/h≈0

Figure 9:
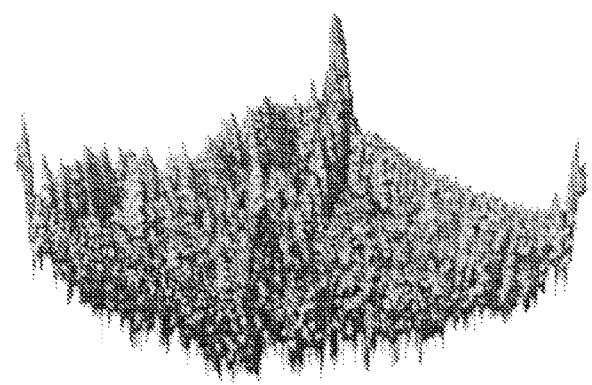
FIG. 9 illustrates a magnitude plot as a surface plot for one example of a two-dimensional inverse Fast Fourier transform (2D-IFFT).

The distance and velocity were calculated with equations 33 and 34. A surface plot of the scene is depicted in FIG. 9.

Some methods and corresponding features of the present disclosure can be performed by hardware modules, software routines, or a combination of hardware and software. To the extent that software is employed, for example by a baseband processor or other processor associated with the power amplifier, the software may be provided via a "computer readable medium", which includes any medium that participates in providing instructions to the processor. Such a computer readable medium may take numerous forms, including but not limited to, non-volatile media, volatile media, and transmission media. Non-volatile media includes, for example, optical disks (such as CDs, DVDs, etc.) or magnetic disks (such as floppy disks, tapes, etc.). Volatile media includes dynamic memory, such as ferroelectric memory, SRAM, or DRAM. Transmission media includes coaxial cables, copper wire, fiber optics, etc. that could deliver the instructions over a network or between communication devices. Transmission media can also include electromagnetic waves, such as a voltage wave, light wave, or radio wave.

Although the invention has been illustrated and described with respect to one or more implementations, alterations and/or modifications may be made to the illustrated examples without departing from the spirit and scope of the appended claims. For example, although several examples above are discussed with regards to triangular or substantially triangular ramps, other non-triangular ramps are also contemplated as constituting legal equivalents. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for detecting a range and a velocity of a target, comprising:
    transmitting an electromagnetic wave over a frequency range, wherein a period of the wave comprises a number of consecutive ramps, a first substantially triangular ramp in the period transmitted over a first portion of the frequency range, and a second substantially triangular ramp in the period transmitted over a second portion of the frequency range that differs from the first portion, the second substantially triangular ramp offset by a frequency shift relative to the first substantially triangular ramp;
    receiving a scattered wave reflected from the target, where the scattered wave is generated when the transmitted electromagnetic wave reflects from the target; and
    processing the received scattered wave to determine the range and the velocity of the target.

2. The method of claim 1, wherein processing the scattered wave further comprises:
    sampling values in the received scattered wave at approximately equally spaced sampling intervals; and
    associating the sampled values with a frequency step.

3. The method of claim 2, further comprising:
    determining a range resolution for the target as a function of the number of consecutive ramps in the period and the frequency step.

4. The method of claim 2, further comprising:
    determining a velocity resolution for the target as a function of the number of consecutive ramps in the period and the ramp duration.

5. The method of claim 2, further comprising
    determining the range and the velocity of the target by performing a two-dimensional transform on the sampled values; and
    applying a constant false alarm rate algorithm to a result of the two-dimensional transform to determine the range and the velocity of the target.

6. The method of claim 5, wherein an estimated range of the target is given by the following relationship:

$$R = \frac{c \cdot (L_z \cdot T_A \cdot k - N_z \cdot T_s \cdot p)}{2\Delta f \cdot T_A - 2 \cdot f_{step} \cdot T_s) N_z \cdot L_z}$$

c representing the speed of light;
$L_Z$ and $N_z$ representing a number of points in the two dimensional transform after zero padding;
$T_s$ representing the ramp duration of the first and second ramp;
k and p representing locations of peaks in the two-dimensional transform
$\Delta F$ representing the frequency shift;
$T_A$ representing the sampling interval; and
$f_{step}$ representing the frequency step.

7. A method for detecting a range and a velocity of a target, comprising:
    transmitting a first consecutive ramp over a first portion of a frequency range, the first consecutive ramp comprising a first ramp segment that is piece-wise continuous with a second ramp segment, wherein the first ramp segment has one of a positive and a negative slope and the second ramp segment has the other of the positive and the negative slope; and
    transmitting a second consecutive ramp over a second portion of the frequency range that differs from the first portion of the frequency range, the second consecutive ramp comprising: a third ramp segment having approximately the one slope and being piece-wise continuous with the second ramp segment, and a fourth ramp segment having approximately the other slope and being piece-wise continuous with the third ramp segment.

8. The method of claim 7, further comprising:
transmitting additional ramps over additional fractions of the frequency range, each additional ramp offset by the frequency shift relative to the ramps adjacent thereto.

9. The method of claim 7, further comprising:
receiving a scattered wave reflected from the target, where the scattered wave is generated when the transmitted ramps reflect from the target;
sampling values in the received scattered wave at approximately equally spaced sampling intervals; and
associating the sampled values with a respective frequency step.

10. The method of claim 9, further comprising:
determining a range resolution for the target as a function of both a number of consecutive ramps in a period of an electromagnetic wave associated with the transmitted ramps and the frequency step.

11. The method of claim 9, further comprising:
determining a velocity resolution for the target as a function of both a number of consecutive ramps in a period of an electromagnetic wave associated with the transmitted ramps and a ramp duration associated with the transmitted ramps.

12. The method of claim 9, further comprising
determining the range and the velocity of the target by performing a two-dimensional transform function on the sampled values; and
applying a constant false alarm rate algorithm to a result of the two-dimensional transform to determine the range and the velocity of the target.

13. A radar system, comprising:
a radar transmitter configured to transmit an electromagnetic wave over a frequency range, the electromagnetic wave including a first substantially triangular ramp associated with a first portion of the frequency range and a second substantially triangular ramp associated with a second portion of the frequency range that differs from the first portion, where the first substantially triangular ramp is offset by a frequency shift relative to the first substantially triangular ramp; and
a radar receiver configured to receive a scattered wave reflected from a target, and further configured to determine a range and a velocity of the target as a function of a two-dimensional transform performed on a baseband signal derived from the received scattered wave.

14. The radar system of claim 13, wherein the radar transmitter comprises an analog circuit that comprises:
a voltage controlled oscillator configured to output a series of consecutive ramps to be transmitted over an antenna, and further configured to output a local oscillator frequency that down-converts the scattered wave to the baseband signal.

15. A radar system, comprising:
a memory configured to store ramp-shaping information about a series of consecutive ramps to be transmitted;
a control state machine configured to read the memory and present slope information related to the ramp shaping information to an accumulator; and
calibration and interpolation circuitry configured to receive un-interpolated frequency information from the accumulator and provide an interpolated value to an analog circuit that includes a voltage controlled oscillator.

16. The radar system of claim 15, wherein the voltage controlled oscillator is configured to output a series of consecutive ramps to be transmitted over a transmit antenna based on the ramp shaping-information.

17. The radar system of claim 16, where the voltage controlled oscillator is configured to output a local oscillator signal, the radar system further comprising:
a receive antenna for receiving a scattered wave that reflects from a target, where the scattered wave is generated when the transmitted radio wave reflects from the target;
a mixer for down-converting the scattered wave to a down-converted signal as a function of the local oscillator signal.

18. The radar system of claim 16, wherein the series of consecutive ramps comprises:
a first consecutive ramp transmitted over a first portion of a frequency range, the first consecutive ramp comprising: a first ramp segment that is piece-wise continuous with a second ramp segment, wherein the first ramp segment has one of a positive and a negative slope and the second ramp segment has the other of the positive and the negative slope; and
a second consecutive ramp transmitted over a second portion of the frequency range that differs from the first portion, the second consecutive ramp comprising: a third ramp segment having approximately the one slope and being piece-wise continuous with the second ramp segment, and a fourth ramp segment having approximately the other slope and being piece-wise continuous with the third ramp segment.

19. A radar system, comprising:
a radar transmitter configured to transmit an electromagnetic wave over a frequency range, the electromagnetic wave including a first substantially triangular ramp associated with a first portion of the frequency range and a second substantially triangular ramp associated with a second portion of the frequency range that differs from the first portion, where the first substantially triangular ramp is offset by a frequency shift relative to the first substantially triangular ramp;
wherein the radar transmitter comprises an interpolation control circuit that works in conjunction with a calibration memory tuning law circuit to deliver a linear ramp segment within the first and second ramps.

20. A radar system, comprising:
a radar transmitter configured to transmit an electromagnetic wave over a frequency range, the electromagnetic wave including a first substantially triangular ramp associated with a first portion of the frequency range and a second substantially triangular ramp associated with a second portion of the frequency range that differs from the first portion, where the first substantially triangular ramp is offset by a frequency shift relative to the first substantially triangular ramp;
wherein the radar transmitter comprises:
a memory configured to store ramp-shaping information about the first and second ramps;
a control state machine configured to read ramp-shaping information from the memory and present slope information related to the ramp-shaping information to an accumulator; and
calibration and interpolation circuitry configured to receive un-interpolated frequency information from the accumulator and provide an interpolated value to a voltage controlled oscillator.

* * * * *